United States Patent
Skinner et al.

(10) Patent No.: US 10,960,791 B1
(45) Date of Patent: Mar. 30, 2021

(54) VEHICLE SEAT ANCHOR ASSEMBLY

(71) Applicant: Ford Global Technologies, LLC, Dearborn, MI (US)

(72) Inventors: Philip Skinner, Plymouth, MI (US); Kurt Leon Kormos, Milford, MI (US); Curtis Stanhope, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/688,441

(22) Filed: Nov. 19, 2019

(51) Int. Cl.
*B60N 2/28* (2006.01)

(52) U.S. Cl.
CPC .............. *B60N 2/289* (2013.01); *B60N 2/28* (2013.01); *B60N 2/2893* (2013.01)

(58) Field of Classification Search
CPC .... B60N 2/2887; B60N 2/2893; B60N 2/289; B60N 2/28
USPC ....................................................... 297/253
See application file for complete search history.

(56) References Cited

U.S. PATENT DOCUMENTS

| | | | |
|---|---|---|---|
| 9,061,619 B2 * | 6/2015 | Mantke | B60N 2/289 |
| 9,604,555 B2 * | 3/2017 | Fujikake | B60N 2/289 |
| 9,630,537 B2 * | 4/2017 | Kajiwara | B60N 2/58 |
| 9,676,304 B2 * | 6/2017 | del Puerto Camargo | B60N 2/2887 |
| 9,738,183 B2 * | 8/2017 | Szlag | B60N 2/58 |
| 2018/0361890 A1 * | 12/2018 | Ishizaka | B60N 2/2893 |

FOREIGN PATENT DOCUMENTS

| | | | | |
|---|---|---|---|---|
| DE | 102015221450 A1 * | 5/2017 | | B60N 2/6009 |
| JP | 2001277920 B2 | 10/2001 | | |
| JP | 2010064636 | 3/2010 | | |
| JP | 2015036282 B2 | 2/2015 | | |
| JP | 2018012434 B2 | 1/2018 | | |
| KR | 101716978 B1 | 3/2017 | | |

* cited by examiner

*Primary Examiner* — Milton Nelson, Jr.
(74) *Attorney, Agent, or Firm* — David Coppiellie; Price Heneveld LLP

(57) ABSTRACT

A vehicle seating assembly includes a seat base operably coupled with a seatback and an anchor housing operably coupled with one of the seat base and the seatback. The anchor housing includes a body defining a cavity and a slot in communication with the cavity. First and second sidewalls of the body define first and second receiving wells, respectively. A cam includes first and second arms that include first and second protrusions, respectively. The first and second protrusions are configured to be received by the first and second receiving wells, respectively. The cam is positioned within the cavity of the body and is rotatable between an open position and a closed position. An anchor extends between the seat base and the seatback and is operably coupled with the anchor housing when the cam is in the closed position.

19 Claims, 6 Drawing Sheets

VEHICLE SEAT ANCHOR ASSEMBLY

FIELD OF THE DISCLOSURE

The present disclosure generally relates to an ISOFIX anchor assembly, and more specifically to an anchor housing for an ISOFIX anchor assembly.

BACKGROUND OF THE DISCLOSURE

ISOFIX is the international standard for attachment points for child seats in vehicles. ISOFIX anchor assemblies are used to couple child seats with vehicle seating assemblies.

SUMMARY OF THE DISCLOSURE

According to one aspect of the present disclosure, a vehicle seating assembly includes a seat base operably coupled with a seatback. An anchor housing is operably coupled with one of the seat base and the seatback. The anchor housing includes a body defining a cavity and a slot. The slot is in communication with the cavity. A first sidewall of the body defines a first receiving well, and a second sidewall of the body defines a second receiving well. A cam includes a first arm that includes a first protrusion and a second arm that includes a second protrusion. The first protrusion is configured to be received by the first receiving well, and the second protrusion is configured to be received by the second receiving well. The cam is positioned within the cavity of the body and is rotatable between an open position and a closed position. An anchor extends between the seat base and the seatback. The anchor is operably coupled with the anchor housing when the cam is in the closed position.

Embodiments of this aspect, or the other aspects, of the disclosure can include any one or a combination of the following features:
- a first arm includes a first extension and a second arm includes a second extension, wherein each of the first and second extensions includes a substantially arcuate inner edge;
- an anchor is configured to abut an inner edge of each of first and second extensions when the anchor is coupled with an anchor housing;
- a stop is positioned on one of a first arm and a second arm and is configured to retain a cam in a closed position;
- a slot is in communication with first and second retention spaces configured to receive an anchor;
- a first retention space is at least partially defined by a first retention rib and a second retention space is at least partially defined by a second retention rib; and/or
- a cam is configured to at least partially cover a slot when the cam is in a closed position.

According to another aspect of the present disclosure, an anchor assembly for a vehicle seating assembly includes an anchor that extends between a seat base and a seatback. An anchor housing is operably coupled with the anchor. The anchor housing includes a body that has first and second sidewalls and defines a cavity. The body further defines a slot in communication with the cavity. At least one of the cavity and the slot is configured to at least partially receive the anchor. A cam includes first and second arms rotatably coupled with the body. The cam is movable between an open position and a closed position. The cam is configured to at least partially cover the slot when the cam is in the closed position.

Embodiments of this aspect, or the other aspects, of the disclosure can include any one or a combination of the following features:
- a cover is configured to be operably coupled with a body to conceal a cavity;
- a cover includes indicia configured to identify an anchor to a user;
- a slot is in communication with a first retention space defined by a first sidewall of a body and a second retention space defined by a second sidewall of the body;
- one of first and second arms includes a stop configured to retain a cam in one of an open position and a closed position;
- a first sidewall of a body defines a first receiving well defined proximate a first retention portion and configured to rotatably receive a first protrusion of a first arm, and a second sidewall of the body defines a second receiving well defined proximate a second retention portion and configured to rotatably receive a second protrusion of a second arm, wherein a cam is rotatable about an axis extending through the first and second protrusions;
- an anchor is configured to abut first and second inner edges of first and second arms when the anchor is coupled with an anchor housing to rotate a cam from an open position into a closed position; and/or
- an anchor is configured to be operably coupled with a child seat.

According to another aspect of the present disclosure, an anchor assembly for coupling a child seat with a vehicle seating assembly includes an anchor configured to be operably coupled with said child seat. An anchor housing is operably coupled with the anchor. The anchor housing includes a body that has first and second sidewalls joined by a rear wall. A slot is defined by the first and second sidewalls and the rear wall. A cam is rotatably coupled with the body and includes first and second arms that extend parallel from a rear member and are rotatably coupled with the first and second sidewalls of the body. The cam is rotatable about an axis extending between the first and second arms and is movable between an open position and a closed position.

Embodiments of this aspect, or the other aspects, of the disclosure can include any one or a combination of the following features:
- a first arm includes a first extension and a second arm includes a second extension, wherein one of the first and second extensions includes a stop configured to selectively retain a cam in one of an open position and a closed position;
- a slot includes first and second retention spaces configured to receive an anchor, wherein each of the first and second retention spaces is at least partially defined by a substantially arcuate edge;
- a body includes an upper portion and a lower portion spaced apart by a slot, wherein the upper portion is offset from the lower portion; and/or
- a slot is defined by a substantially linear upper edge spaced apart from a substantially linearly lower edge, wherein the slot has a tapered width extending away from a rear wall.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to In the drawings.

DETAILED DESCRIPTION OF THE PREFERRED EMBODIMENTS

Figure 1:
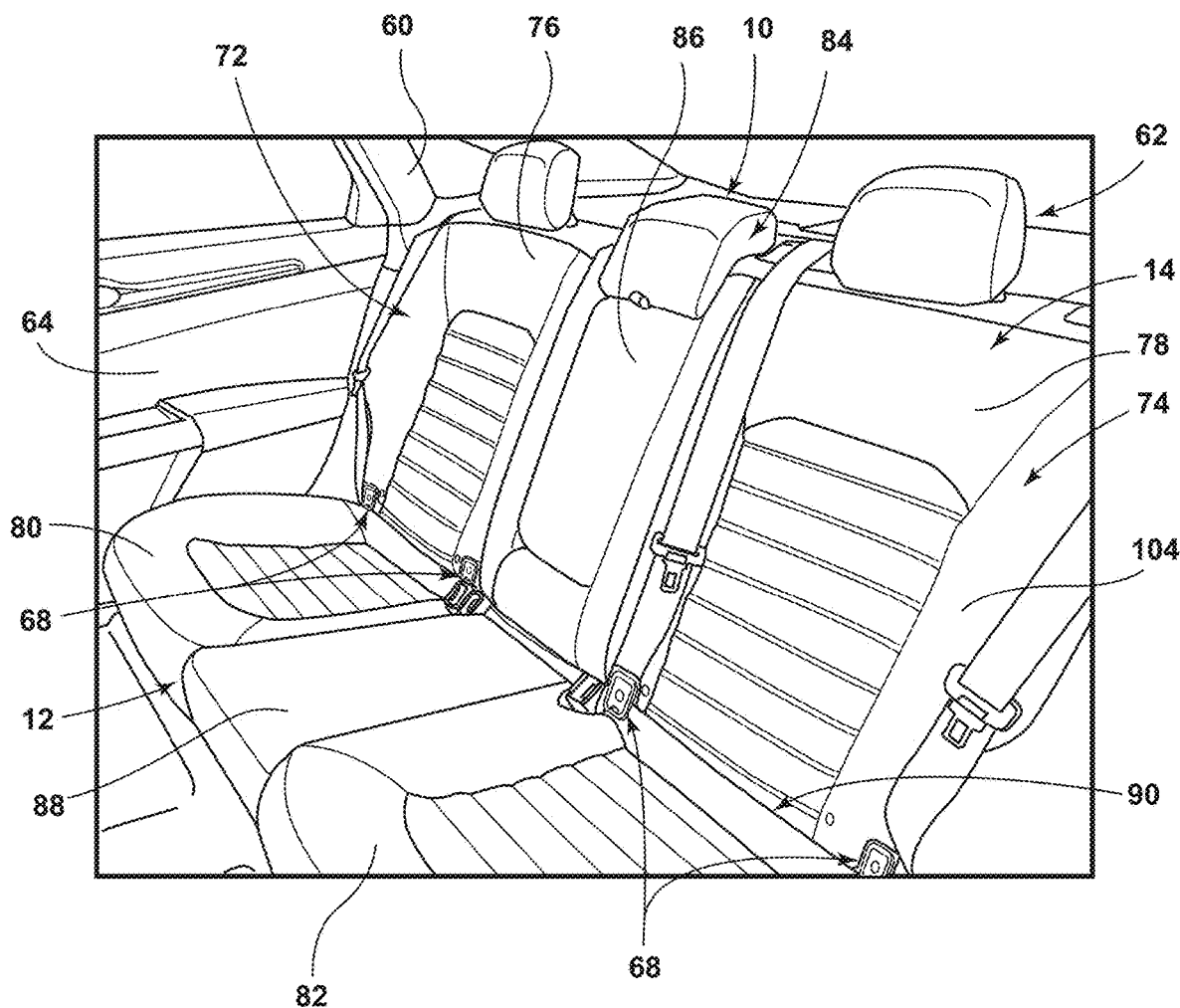
FIG. 1 is a side perspective view of a vehicle seating assembly positioned within a vehicle and including anchor assemblies, according to various examples.

The present illustrated embodiments reside primarily in combinations of method steps and apparatus components related to an ISOFIX anchor assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 2:
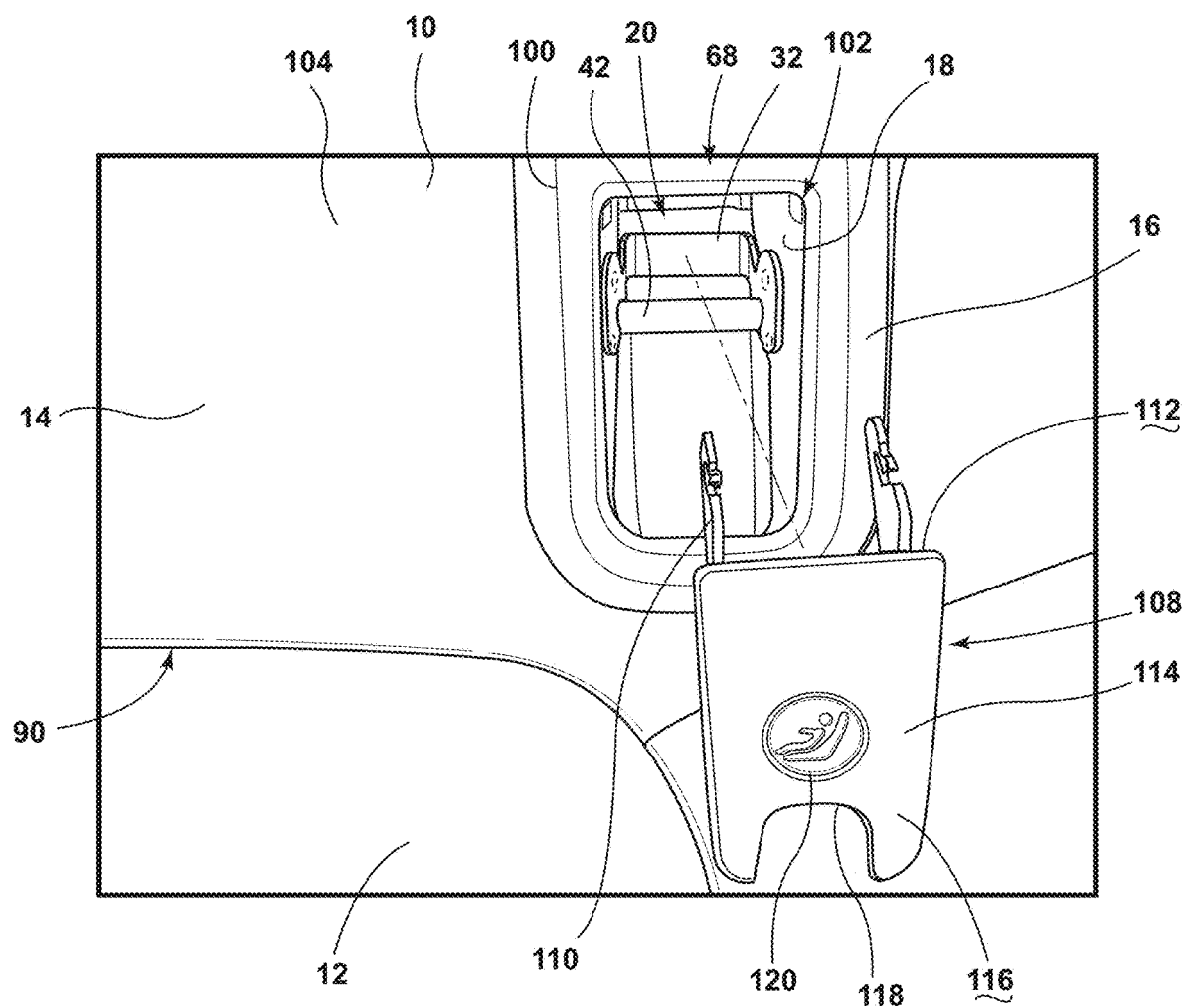
FIG. 2 is an enlarged top perspective view of an anchor assembly, according to various examples.

Referring to FIGS. 1-7, reference numeral 10 generally designates a vehicle seating assembly that includes a seat base 12 operably coupled with a seatback 14. An anchor housing 16 is operably coupled with one of the seat base 12 and the seatback 14. The anchor housing 16 includes a body 18 that defines a cavity 20 and a slot 22 in communication with the cavity 20. A first sidewall 24 of the body 18 defines a first receiving well 26 and a second sidewall 28 of the body 18 defines a second receiving well 30. A cam 32 includes a first arm 34 that has a first protrusion 36 and a second arm 38 that has a second protrusion 40. The first protrusion 36 is configured to be received by the first receiving well 26, and the second protrusion 40 is configured to be received by the second receiving well 30. The cam 32 is positioned within the cavity 20 of the body 18 and is rotatable between an open position (FIG. 3A) and a closed position (FIG. 3B). An anchor 42 extends between the seat base 12 and the seatback 14. The anchor 42 is operably coupled with the anchor housing 16 when the cam 32 is in the closed position (FIG. 2). When the anchor 42 is operably coupled with the anchor housing 16, a child seat 44 may be coupled with the anchor 42.

Referring now to FIG. 1, the vehicle seating assembly 10 is illustrated as a rear vehicle seating assembly 10 of a vehicle 60. More specifically, the vehicle seating assembly 10 is shown as a rear bench seat that spans laterally across an interior cabin 62 of the vehicle 60 between opposing side doors 64 and is attached along a rear wall of the interior cabin 62. The vehicle seating assembly 10 includes one or more anchor assemblies 68 for coupling a child seat 44 with the vehicle seating assembly 10 (see FIGS. 5-7). It is contemplated that the anchor assembly 68 may be arranged within alternative types of seating assemblies 10, including elevated bucket seats, and/or may be arranged within seating assemblies 10 that may be found at alternative locations within the vehicle 60, including a mid-row location or a front seat location. It is also understood that the anchor assembly 68 may be incorporated in any vehicle types, such as a sedan, a truck, an SUV, a van, or other vehicles without departing from the scope of the present disclosure.

The vehicle seating assembly 10 includes a first seat 72 and a second seat 74. The seatback 14 includes a first seatback 76 of the first seat 72 and a second seatback 78 of the second seat 74. The seat base 12 includes a first seat base 80 operably coupled with the first seatback 76 and a second seat base 82 operably coupled with the second seatback 78. The first and second seats 72, 74 may be separated by a middle seat portion 84 on the inboard side of the first seat 72 that is configured to accommodate a third passenger. The middle seat portion 84 may be separate from the first and second seats 72, 74 to include a middle seatback 86 and/or middle seat base 88. Each of the first and second seats 72, 74 includes a joinder 90 formed where the respective seatback 76, 78 is coupled with the respective seat base 80, 82. The joinder 90 of the seats 72, 74 may extend co-linearly across the vehicle seating assembly 10.

Referring still to FIG. 1, each of the first and second seats 72, 74 includes at least one anchor assembly 68. For example, as illustrated, the first seat 72 includes a pair of anchor assemblies 68 positioned on opposing sides of the first seat 72, and the second seat 74 includes a second pair of anchor assemblies 68 positioned on opposing sides of the second seat 74. Each anchor assembly 68 is positioned proximate the joinder 90 of the respective seat 72, 74. For example, each anchor assembly 68 may be positioned between the respective seatback 76, 78 and the respective seat base 80, 82 or may be positioned above the joinder 90 within the respective seatback 76, 78.

Referring now to FIG. 2, an exemplary anchor assembly 68 is illustrated. The anchor assembly 68 is positioned within the seatback 14 proximate the joinder 90 of the seat 74. The anchor assembly 68 includes anchor housing 16 coupled with and at least partially received by the seatback 14. The anchor housing 16 includes a body 18 operably coupled with a cam 32. The body 18 includes a rim 100 extending about a periphery of the body 18 and framing a front opening 102 of the anchor housing 16. When the anchor housing 16 is coupled with the vehicle seating assembly 10, the rim 100 may be operably coupled with a seat covering 104 of the vehicle seating assembly 10, such as, for example, trim stock. The rim 100 is configured to be substantially flush with the seat covering 104 when the anchor housing 16 is coupled with the vehicle seating assembly 10.

An anchor 42 extends forward through the seatback 14 and is operably coupled with the anchor housing 16. In other examples, the anchor housing 16 may be positioned between the seatback 14 and the seat base 12 such that the anchor 42 extends between the seatback 14 and the seat base 12. The anchor 42 is at least partially received by a cavity 20 defined by the body 18 of the anchor housing 16 and is coupled with the body 18 via the cam 32, as discussed in more detail elsewhere herein. In use, the anchor 42 is configured to be operably coupled with a child seat 44.

When the anchor assembly 68 is not in use, the anchor 42 may be visible between the seat base 12 and the seatback 14 and through the front opening 102 of the anchor housing 16. A cover 108 may be selectively coupled with the anchor housing 16 to conceal the anchor 42 when the anchor assembly 68 is not in use. The cover 108 includes one or more connectors 110 extending from a rear surface 112 of a faceplate 114. The one or more connectors 110 are configured to engage with the anchor housing 16 to couple the cover 108 with the anchor housing 16. Alternatively, any type of fastener may be used in place of the connectors 110, such as, for example, snap fitting, screws, magnets, etc. When the cover 108 is coupled with the anchor housing 16, the faceplate 114 is substantially flush with the rim 100 of the body 18 of the anchor housing 16. The cover 108 may include a gripping feature 118, such as a cutout or pull, configured to allow a user to grip the cover 108 for removal. In various examples, a front surface 116 of the faceplate 114 may include indicia 120 indicating the positioning of the anchor 42 within the anchor housing 16 behind the cover 108. The indicia 120 further allows a user to identify the point of attachment for the child seat 44. In various examples, the indicia 120 may also be located on the anchor housing 16 to be visible when the cover 108 is removed.

Referring now to FIGS. 3A-4B, the anchor housing 16 includes the body 18 and the cam 32. The body 18 includes first and second sidewalls 24, 28 spaced apart by a top wall 128 and a bottom wall 130. The first and second sidewalls 24, 28 and the top and bottom walls 128, 130 extend rearward from the rim 100. A rear wall 132 extends between the first and second sidewalls 24, 28 and the top and bottom walls 128, 130 to define the cavity 20 configured to receive the anchor 42 (see FIG. 2). In various examples, the first and second sidewalls 24, 28 are substantially wedge-shaped when the body 18 is viewed in profile.

The body 18 of the anchor housing 16 further defines a slot 22. For example, the slot 22 may be defined by the first and second sidewalls 24, 28 and the rear wall 132 of the body 18. The slot 22 may divide the body 18 of the anchor housing 16 into an upper portion 140 and a lower portion 142. As illustrated in FIGS. 3A-4B, the upper portion 140 of the body 18 may extend rearward from the rim 100 a first distance D1 and the lower portion 142 of the body 18 may extend rearward from the rim 100 a second distance D2, and the first distance D1 may be greater than the second distance D2. In other words, the upper portion 140 of the body 18 may be offset from the lower portion 142 of the body 18. However, it is contemplated that the second distance D2 may be the same or greater than the first distance D1 without departing from the scope of the present disclosure. For example, the upper portion 140 and the lower portion 142 of the body 18 may be sized so that the rear wall 132 is substantially planar across the upper portion 140 and the lower portion 142.

The slot 22 is defined by the body 18 of the anchor housing 16 to at least partially receive the anchor 42 (see FIG. 2) and is in communication with the cavity 20. The slot 22 is defined to include a first side portion 146 defined by the first sidewall 24 and a second side portion 148 defined the second sidewall 28. The first and second side portions 146, 148 are in communication with a rear portion 150. The first and second side portions 146, 148 and the rear portion 150 of the slot 22 may be defined by a substantially linear upper edge 154 spaced apart from a substantially linear lower edge 156. Each of the first and second side portions 146, 148 may be defined to be tapered extending away from the rear portion 150. In other words, each of the first and second side portions 146, 148 may be defined as having a first width W1 proximate the rear portion 150 and a second width W2 proximate the rim 100. The first width W1 may be greater than the second width W2.

The slot 22 is further defined such that the first side portion 146 is in communication with a first retention space 160 proximate the rim 100 and the second side portion 148 is in communication with a second retention space 162 proximate the rim 100. A first end edge 168 is substantially arcuate and extends between the upper and lower edges 154, 156 to at least partially define the first retention space 160, and a second end edge 170 is substantially arcuate and extends between the upper and lower edges 154, 156 to at least partially define the second retention space 162. In various examples, the first and second retention spaces 160, 162 are at least partially defined by first and second retention ribs 174, 176, respectively. The first and second retention ribs 174, 176 are positioned to extend upward from the lower edge 156 toward the upper edge 154. The first and second retention ribs 174, 176 may be generally rounded. Alternatively, the first and second retention spaces 160, 162 may be at least partially defined by the first and second sidewalls 24, 28 proximate each of the first and second retention spaces 160, 162 so that the retention spaces 160, 162 each form a hook-shape at an end of the first and second side portions 146, 148, respectively, or any other shape configured to define a separate space for retaining the anchor 42.

Referring still to FIGS. 3A-4B, the first sidewall 24 defines the first receiving well 26 positioned proximate the first retention space 160. For example, the first sidewall 24 may define the first receiving well 26 above the upper edge 154. The second sidewall 28 defines the second receiving well 30 positioned proximate the second retention space 162. The second receiving well 30 is defined opposite of and aligned with the first receiving well 26.

As introduced above, the anchor housing 16 of the anchor assembly 68 further includes the cam 32. The cam 32 includes first and second arms 34, 38 extending parallel from a rear member 180. Each of the first and second arms 34, 38 and the rear member 180 are substantially planar. When the cam 32 is positioned within the cavity 20 of the anchor housing 16, the first arm 34 is aligned and/or flush with the first sidewall 24 of the body 18, and the second arm 38 is aligned and/or flush with the second sidewall 28 of the body 18.

The first arm 34 includes a first extension 186 integrally formed with a terminal end of the first arm 34, and the second arm 38 includes a second extension 188 integrally formed with a terminal end of the second arm 38. The first and second extensions 186, 188 may have the same or substantially the same shape or may have different shapes. As illustrated, each of the first and second extensions 186, 188 is generally hook-shaped when viewed in profile. Each of the first and second extensions 186, 188 may be generally arcuate. The first extension 186 includes a substantially arcuate first inner edge 192 and a first terminal end 198. The second extension 188 includes a substantially arcuate second inner edge 194 and a second terminal end 200. The first and second terminal ends 198, 200 may have a substantially triangular shape when viewed in profile. Further, the first and second terminal ends 198, 200 may include first and second stops 204, 206, respectively. Each of the stops 204, 206 may be substantially hemispherical or otherwise arcuate. The stops 204, 206 are positioned proximate an apex of the first and second terminal ends 198, 200, respectively. It is contemplated that only one of the first and second arms 34, 38 may include a stop without departing from the scope of the present disclosure.

Referring still to FIGS. 3A-4B, the cam 32 includes a first protrusion 36 extending substantially perpendicularly from the first arm 34, and a second protrusion 40 extending substantially perpendicularly from the second arm 38. The first protrusion 36 is configured to be rotatably received by the first receiving well 26 of the body 18, and the second protrusion 40 is configured to be rotatably received by the second receiving well 30 of the body 18. The first protrusion 36 may be positioned to extend from the first extension 186 and the second protrusion 40 may be positioned to extend from the second extension 188. For example, the first protrusion 36 may be positioned proximate and/or above the first inner edge 192 of the first extension 186, and the second protrusion 40 may be positioned proximate and/or above the second inner edge 194 of the second extension 188. The first and second protrusions 36, 40 are positioned on each of the first and second arms 34, 38 such that, when the first and second protrusions 36, 40 are rotatably received by the first and second receiving wells 26, 30, respectively, the first and second inner edges 192, 194 are substantially aligned with the first and second arcuate edges 154, 156 of defining the first and second retention spaces 160, 162 of the body 18. Further, when the cam 32 is rotatably coupled with the body 18 of the anchor housing 16, the cam 32 is rotatable within the cavity 20 of the anchor housing 16 about an axis 210 extending through the first and second protrusions 36, 40.

Figure 3A:
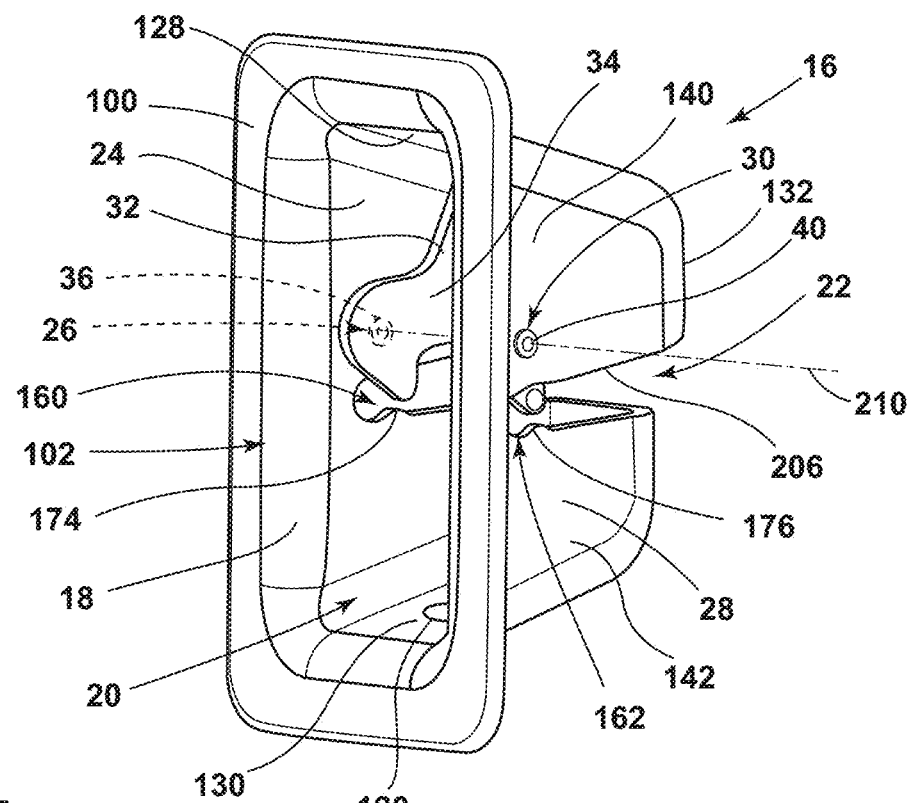
FIG. 3A is a side perspective view of an anchor housing with a cam coupled with a body and in an open position, according to various examples.
Figure 3B:
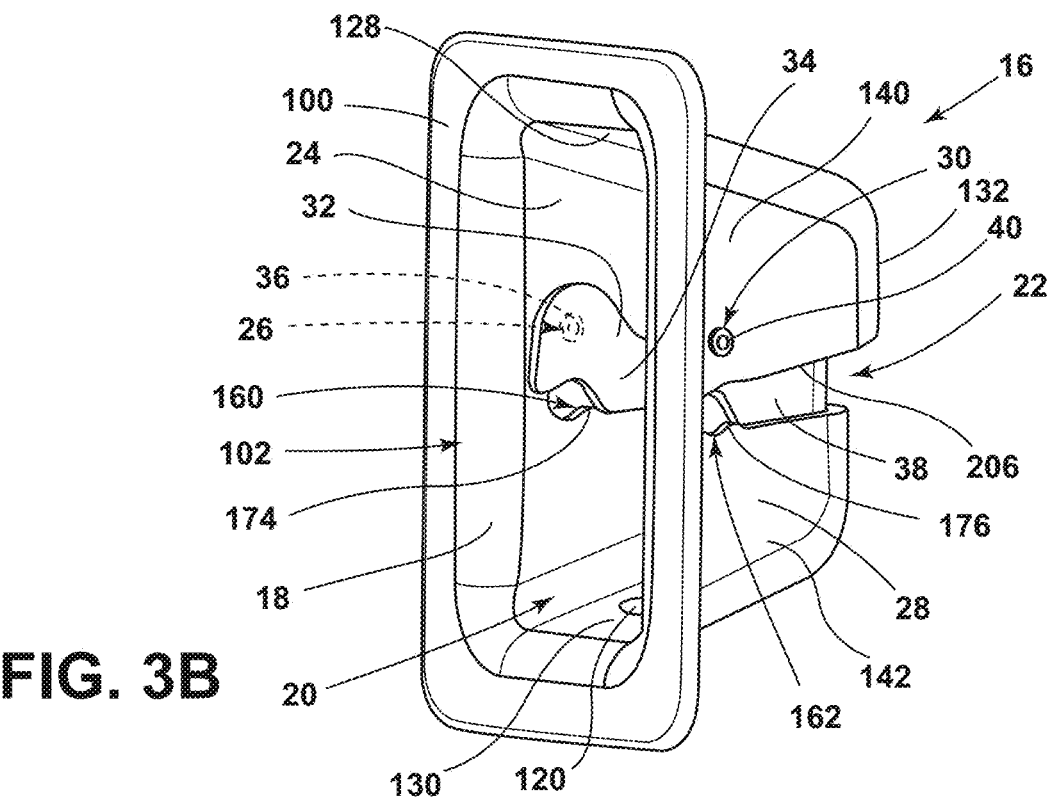
FIG. 3B is a side perspective view of the anchor housing of FIG. 3A with a cam coupled with a body and in a closed position, according to various examples.
Figure 4A:
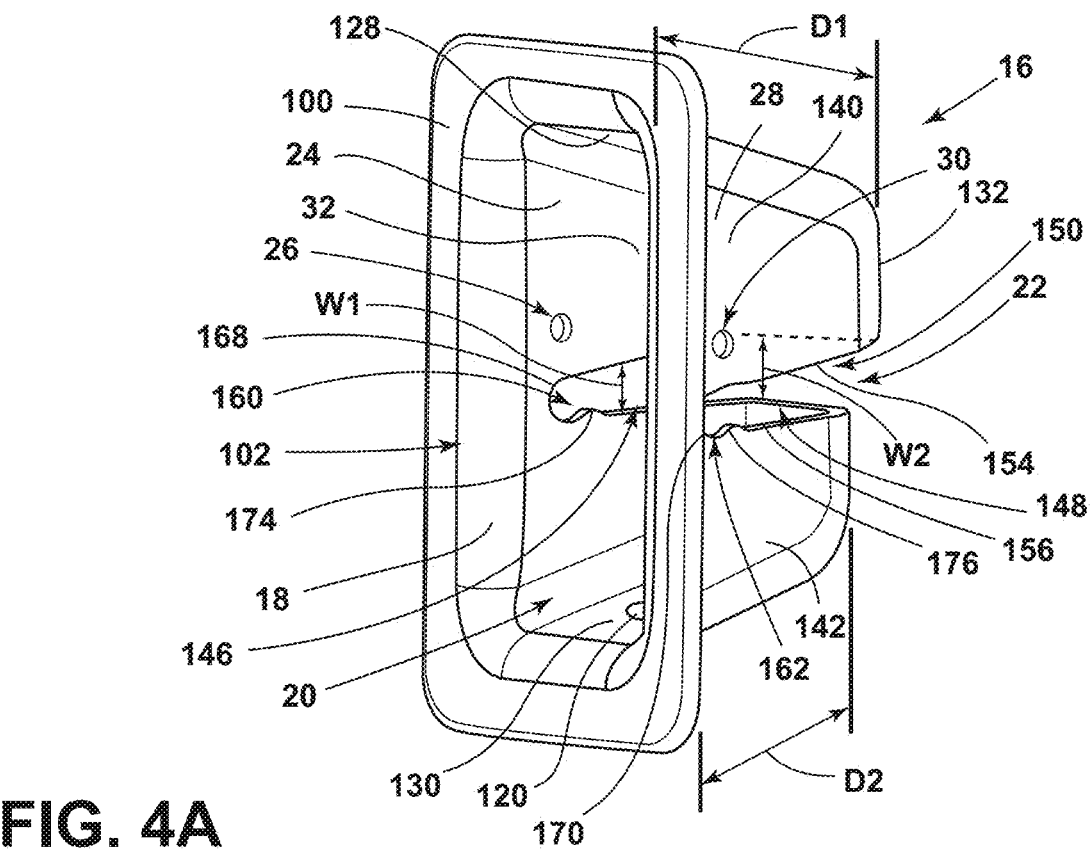
FIG. 4A is a side perspective view of the body of FIG. 3A.
Figure 4B:
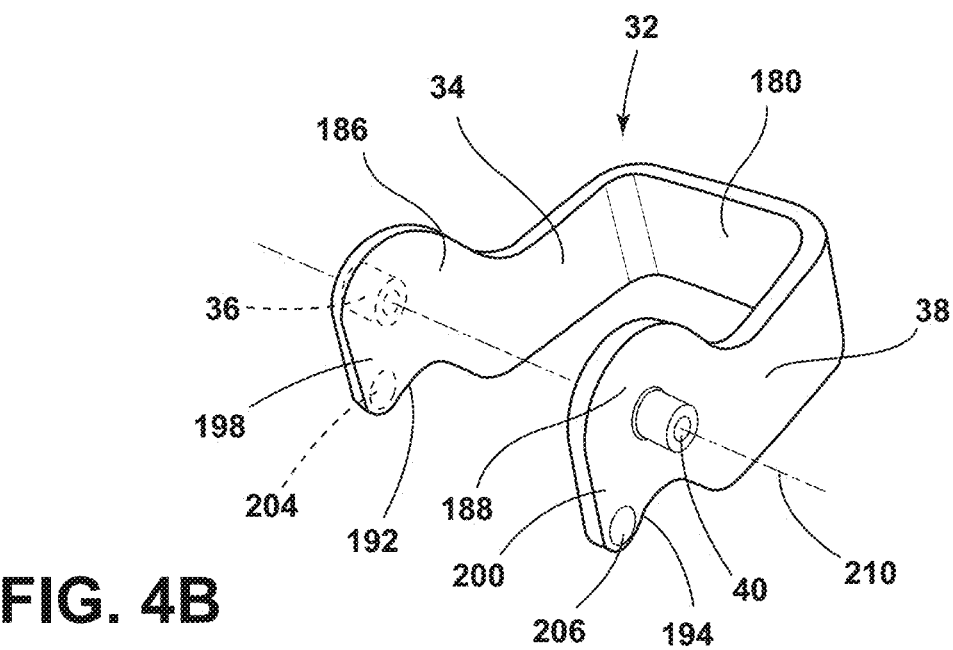
FIG. 4B is a side perspective view of the cam of FIG. 3A.

The cam 32 is rotatable about the axis 210 between an open position (FIG. 3A) and a closed position (FIG. 3B). When the cam 32 is in the open position, the slot 22 of the body 18 is unobstructed. The first and second arms 34, 38 are inclined upward towards the top wall 128 of the body 18, and the rear member 180 of the cam 32 is positioned proximate the top wall 128. The incline of the first and second arms 34, 38 positions the first and second extensions 186, 188 so that the first and second terminal ends 198, 200 are positioned between the upper edge 154 and the lower edge 156 of the slot 22. The first and second stops 204, 206 extend at least partially into the first and second side portions 146, 148 of the slot 22, respectively. When the cam 32 is in the open position, the stops 204, 206 are configured to selectively abut the first and second end edges 168, 170 to prevent the cam 32 from rotating into the closed position without force being applied to the first and second inner edges 192, 194 of the first and second arms 34, 38. This prevents the inadvertent movement of the cam 32 into the closed position without the anchor 42 being positioned through the slot 22 to couple with the anchor housing 16.

When the cam 32 is in the closed position, the rear member 180 of the cam 32 is aligned with and substantially flush with at least part of the rear wall 132 of the body 18 of the anchor housing 16. The rear member 180 is positioned to at least partially obstruct the rear portion 150 of the slot 22, and the first and second arms 34, 38 are positioned to at least partially obstruct the first and second side portions 146, 148 of the slot 22. The first and second inner edges 192, 194 of the first and second extensions 186, 188 are at least partially aligned with the first and second end edges 168, 170 and enclose the first and second retention spaces 160, 162 such that the first and second retention spaces 160, 162 are no longer in communication with the first and second side portions 146, 148 of the slot 22. The stops 204, 206 may also be configured to engage with the first and second sidewalls 24, 28 to prevent inadvertent rotation of the cam 32 from the closed position to the open position.

Figure 5:
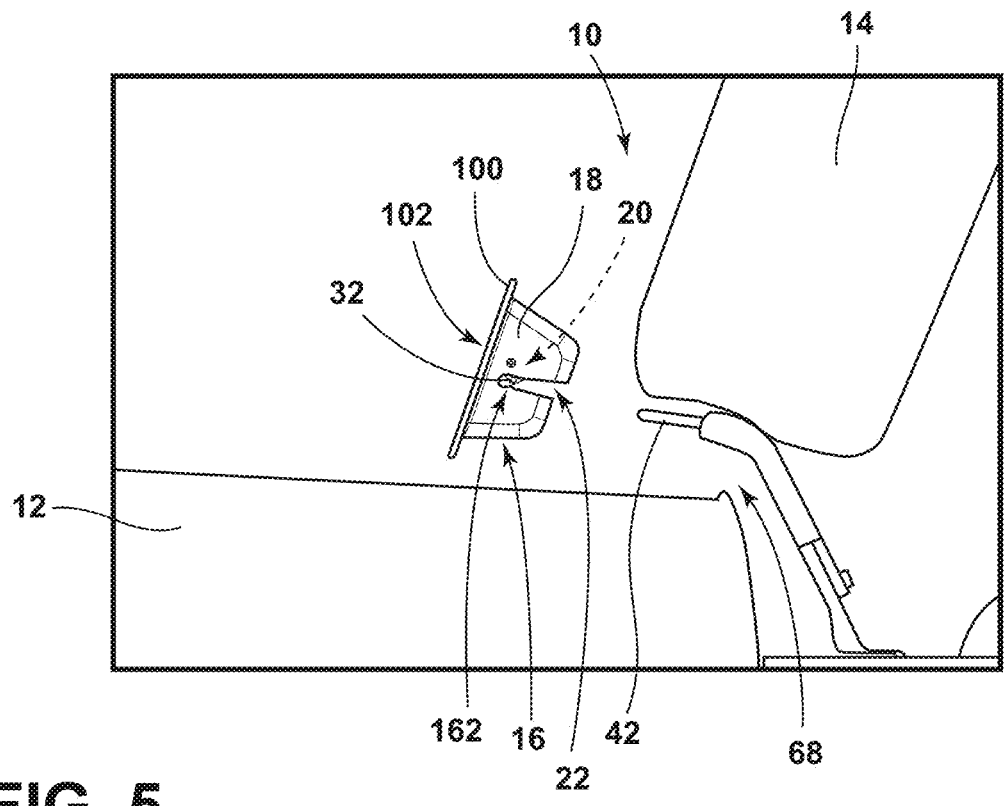
FIG. 5 is a side cross-sectional view of a vehicle seating assembly with an anchor housing spaced apart from the vehicle seating assembly, according to various examples.
Figure 6:
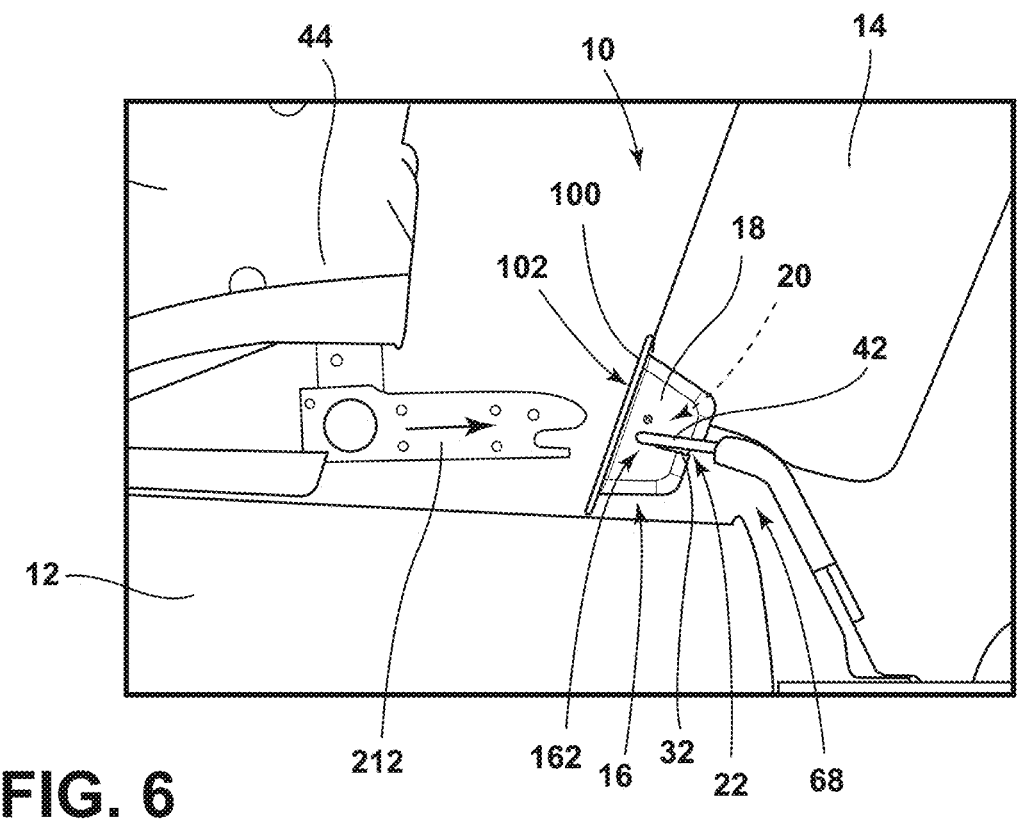
FIG. 6 is a side cross-sectional view of the vehicle seating assembly of FIG. 5 with the anchor housing coupled with an anchor and a child seat spaced apart from the anchor housing and the anchor.
Figure 7:
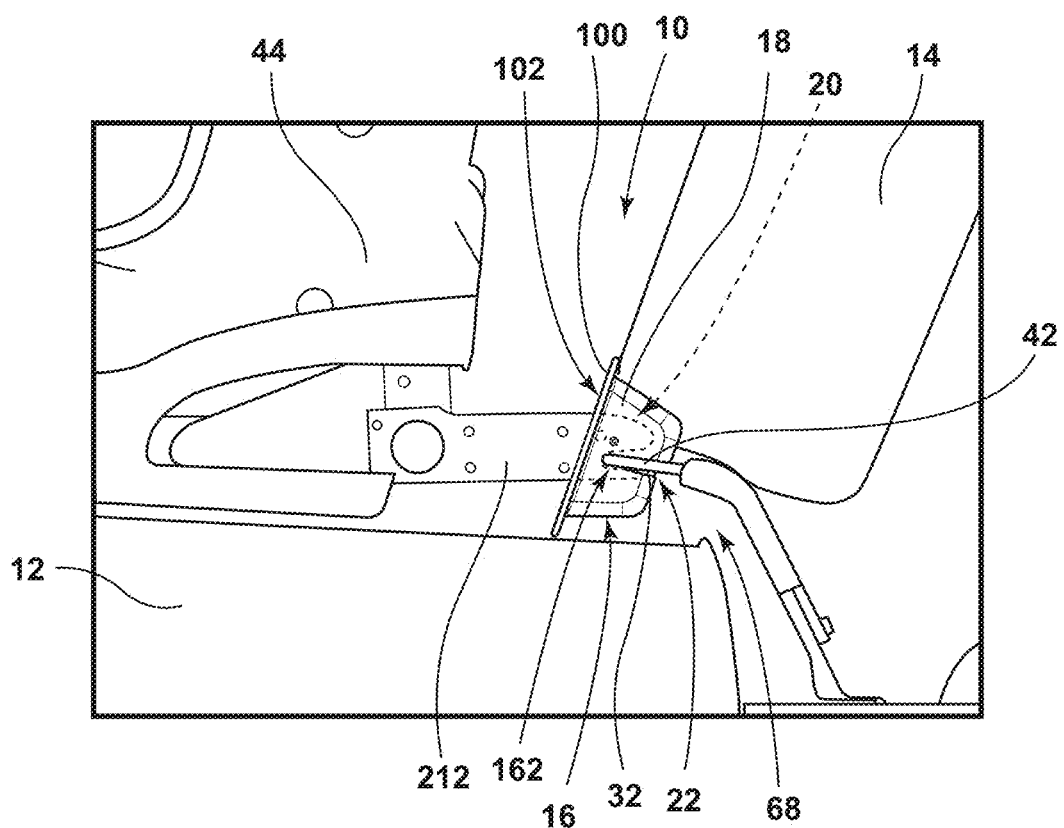
FIG. 7 is a side cross-sectional view of the vehicle seating assembly and child seat of FIG. 6 with the child seat engaged with the anchor.

Referring now to FIGS. 5-7, in use, the anchor 42 is received by the slot 22 and the cavity 20 of the body 18 of the anchor housing 16. As illustrated in FIG. 5, when the anchor 42 is inserted into the slot 22, the anchor housing 16 may be pressed rearward against the vehicle seating assembly 10 until the anchor 42 abuts the first and second inner edges 192, 194 of the first and second extensions 186, 188. The contact between the anchor 42 and the first and second inner edges 192, 194 as the anchor housing 16 is pressed rearward pushes the first and second extensions 186, 188 forward to rotate the cam 32 from the open position to the closed position. The anchor 42 is retained in the first and second retention spaces 160, 162 by the cam 32 when the cam 32 is moved into the closed position. In other words, the cam 32 couples the anchor 42 with the body 18 of the anchor housing 16 when the cam 32 is in the closed position.

As illustrated in FIG. 6, when the anchor 42 is coupled with the anchor housing 16, the child seat 44 may be positioned on the vehicle seating assembly 10. The child seat 44 may include one or more attachment arms 212 extending from a base of the child seat 44 and configured to engage with the anchor 42 of the anchor assembly 68. The one or more attachment arms 212 are received by the front opening 102 and cavity 20 of the anchor housing 16, as illustrated in FIG. 7. The attachment arms 212 may then lock into engagement with the anchor 42 to couple the child seat 44 with the anchor assembly 68.

It will be understood by one having ordinary skill in the art that construction of the described disclosure and other components is not limited to any specific material. Other exemplary embodiments of the disclosure disclosed herein may be formed from a wide variety of materials, unless described otherwise herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle seating assembly comprising:
    a seat base operably coupled with a seatback;
    an anchor housing operably coupled with one of the seat base and the seatback, the anchor housing including:
        a body defining a cavity and a slot in communication with the cavity, wherein a first sidewall of the body defines a first receiving well and a second sidewall of the body defines a second receiving well; and
        a cam including a first arm including a first protrusion and a second arm including a second protrusion, wherein the first protrusion is configured to be received by the first receiving well and the second protrusion is configured to be received by the second receiving well, and further wherein the cam is positioned within the cavity of the body and is rotatable between an open position and a closed position; and
    an anchor extending between the seat base and the seatback, wherein the anchor is operably coupled with the anchor housing when the cam is in the closed position.

2. The vehicle seating assembly of claim 1, wherein the first arm includes a first extension and the second arm includes a second extension, each of the first and second extensions including a substantially arcuate inner edge.

3. The vehicle seating assembly of claim 2, wherein the anchor is configured to abut the inner edge of each of the first and second extensions when the anchor is coupled with the anchor housing.

4. The vehicle seating assembly of claim 1, wherein a stop is positioned on one of the first arm and the second arm and configured to retain the cam in the closed position.

5. The vehicle seating assembly of claim 1, wherein the slot is in communication with first and second retention spaces configured to receive the anchor.

6. The vehicle seating assembly of claim 5, wherein the first retention space is at least partially defined by a first retention rib and the second retention space is at least partially defined by a second retention rib.

7. The vehicle seating assembly of claim 1, wherein the cam is configured to at least partially cover the slot when the cam is in the closed position.

8. An anchor assembly for a vehicle seating assembly, comprising:
    an anchor extending between a seat base and a seatback; and
    an anchor housing operably coupled with the anchor and including:
        a body including first and second sidewalls and defining a cavity and a slot in communication with the cavity, wherein at least one of the cavity and the slot is configured to at least partially receive the anchor; and
        a cam including first and second arms rotatably coupled with the body, wherein the cam is movable between an open position and a closed position, and further wherein the cam is configured to at least partially cover the slot when the cam is in the closed position, wherein the anchor is configured to abut first and second inner edges of the first and second arms when the anchor is coupled with the anchor housing to rotate the cam from the open position into the closed position.

9. The anchor assembly of claim 8, further comprising:
    a cover configured to be operably coupled with the body to conceal the cavity.

10. The anchor assembly of claim 9, wherein the cover includes indicia configured to identify the anchor to a user.

11. The anchor assembly of claim 8, wherein the slot is in communication with a first retention space defined by the first sidewall of the body and a second retention space defined by the second sidewall of the body.

12. The anchor assembly of claim 11, wherein the first sidewall of the body defines a first receiving well defined proximate the first retention space and configured to rotatably receive a first protrusion of the first arm and the second sidewall of the body defines a second receiving well defined proximate the second retention space and configured to rotatably receive a second protrusion of the second arm, and further wherein the cam is rotatable about an axis extending through the first and second protrusions.

13. The anchor assembly of claim 8, wherein one of the first and second arms includes a stop configured to retain the cam in one of the open position and the closed position.

14. The anchor assembly of claim 8, wherein the anchor is configured to be operably coupled with a child seat.

15. An anchor assembly for coupling a child seat with a vehicle seating assembly, comprising:
   an anchor configured to be operably coupled with said child seat; and
   an anchor housing operably coupled with the anchor, wherein the anchor housing includes:
      a body including first and second sidewalls joined by a rear wall, wherein a slot is defined by the first and second sidewalls and the rear wall; and
      a cam rotatably coupled with the body and including first and second arms extending parallel from a rear member and rotatably coupled with the first and second sidewalls of the body, wherein the cam is rotatable about an axis extending between the first and second arms, and further wherein the cam is movable between an open position and a closed position.

16. The anchor assembly of claim 15, wherein the slot is defined by a substantially linear upper edge spaced apart from a substantially linearly lower edge, and further wherein the slot has a tapered width extending away from the rear wall.

17. The anchor assembly of claim 15, wherein the first arm includes a first extension and the second arm includes a second extension, and further wherein one of the first and second extensions includes a stop configured to selectively retain the cam in one of the open position and the closed position.

18. The anchor assembly of claim 15, wherein the slot includes first and second retention spaces configured to receive the anchor, and further wherein each of the first and second retention spaces is at least partially defined by a substantially arcuate edge.

19. The anchor assembly of claim 15, wherein the body includes an upper portion and a lower portion spaced apart by the slot, and further wherein the upper portion is offset from the lower portion.

* * * * *